United States Patent
Chaudoreille (10) Patent No.: US 6,711,865 B2
(45) Date of Patent: Mar. 30, 2004

(54) INTERLOCKING BLOCKS

(75) Inventor: Daniel Chaudoreille, Bordeaux (FR)

(73) Assignee: Pitchoon Ltd., Hong Kong (HK)

( * ) Notice: Subject to any disclaimer, the term of this patent is extended or adjusted under 35 U.S.C. 154(b) by 1 day.

(21) Appl. No.: 10/238,345

(22) Filed: Sep. 9, 2002

(65) Prior Publication Data

US 2003/0051644 A1 Mar. 20, 2003

Related U.S. Application Data

(63) Continuation-in-part of application No. PCT/FR01/00700, filed on Mar. 8, 2001.

(51) Int. Cl.[7] .................................................. E04B 2/08
(52) U.S. Cl. ........................... 52/603; 52/596; 52/608; 52/592.4; 52/592.5
(58) Field of Search ......................... 52/603, 596, 608, 52/592.1, 592.4, 592.5, 592.6; 446/124, 122; 403/345, 346, 347, 354, 359.1, 360, 365

(56) References Cited

U.S. PATENT DOCUMENTS

| | | | | |
|---|---|---|---|---|
| 2,298,975 A | * | 10/1942 | Shelburne | 408/204 |
| 3,443,783 A | | 5/1969 | Fisher | |
| 3,811,219 A | | 5/1974 | Fischer | |
| 4,895,544 A | * | 1/1990 | Fischer | 446/122 |
| 4,932,916 A | * | 6/1990 | Blickle | 446/124 |
| 5,013,245 A | * | 5/1991 | Benedict | 434/170 |
| 5,230,195 A | * | 7/1993 | Sease | 52/592.6 |
| 5,820,436 A | * | 10/1998 | Pohlman | 446/75 |
| 5,832,687 A | * | 11/1998 | Willemsen | 52/592.6 |
| 5,924,906 A | * | 7/1999 | Grafton | 446/121 |
| 5,987,840 A | * | 11/1999 | Leppert | 52/592.6 |
| 6,425,749 B1 | * | 7/2002 | Lettner et al. | 418/182 |

FOREIGN PATENT DOCUMENTS

DE    2056 230    5/1972

* cited by examiner

*Primary Examiner*—Carl D. Friedman
*Assistant Examiner*—Basil Katcheves
(74) *Attorney, Agent, or Firm*—Piper Rudnick LLP (57) ABSTRACT

A modular construction unit including an assembly of a multiplicity of interlocking blocks, at least one of the blocks including, on at least one male end, a male element adapted to be introduced partially and held in place in a concave female element provided in another one of said blocks. The male element has at one end thereof, a first part having in section an essentially circular form of a selected diameter Z and a locking part having in section an essentially square form of larger section to create at longitudinal ends of the first part protruding planes S1 and S2, the length of sides of the square form being essentially equal to the diameter Z of the first part and. The female element has an opening having in section an essentially square form and creating a protruding plane P1, the length of sides of the square form being essentially equal to the diameter Z of the first part, as well as at least one cavity having a section larger than the section of the opening and creating a protruding plane P2.

22 Claims, 11 Drawing Sheets

INTERLOCKING BLOCKS

RELATED APPLICATION

This is a continuation of PCT/FR01/00700 filed Mar. 8, 2001, which claims benefit from French Application No. 00/03050 filed Mar. 9, 2000.

FIELD OF THE INVENTION

This invention relates to the field of creating walls or decorative columns, more specifically, this invention relates to interlocking blocks of the type to create walls or column.

BACKGROUND

Already known in the prior art are interlocking blocks comprising a male element intended to be introduced into a female element provided in another block positioned above or below it. A major drawback of this type of interlocking block is to not exhibit sufficient stability to allow creation of a column.

Another major drawback of this type of interlocking block is that it does not exhibit sufficient stability upon interlocking and, thus, requires application of a binding agent between the assembled blocks or reinforcement elements of the type comprising screws or pins. The finished product created in this manner is rigid and can not be dismantled or can only be dismantled with great difficulty.

Another drawback of this type of interlocking block is that it is not possible to insert a flat element between two blocks create, e.g., a shelf or a work surface or a base.

Also known in the prior art from U.S. Pat. No. 4,932,916 is an interlocking block, the major drawback of which is that it is designed to prevent dismantling of the unit after it has been finished. Thus, it does not allow creation of modular furniture which can be dismantled and the constitutive elements of which are interchangeable.

SUMMARY OF THE INVENTION

A modular construction unit includes an assembly of a multiplicity of interlocking blocks, at least one of the blocks including, on at least one male end, a male element adapted to be introduced partially and held in place in a concave female element provided in another one of said blocks.

The male element comprises at one end thereof, a first part having in section an essentially circular form of a selected diameter Z and a locking part having in section an essentially square form of larger section to create at longitudinal ends of the first part protruding planes S1 and S2, the length of sides of the square form being essentially equal to the diameter Z of the first part.

The female element has an opening having in section an essentially square form and creating a protruding plane P1, the length of sides of the square form being essentially equal to the diameter Z of the first part, as well as at least one cavity having a section larger than the section of the opening and creating a protruding plane P2. This arrangement enables rotation R of the protruding planes S1 and S2, respectively, on the protruding planes P1 and P2, or vice versa.

BRIEF DESCRIPTION OF THE DRAWINGS

Better understanding of the invention will be obtained from the description below, provided purely for explanatory purposes, of one mode of implementation of the invention with reference to the attached FIGS..

DETAILED DESCRIPTION

It will be appreciated that the following description is intended to refer to specific embodiments of the invention selected for illustration in the drawings and is not intended to define or limit the invention, other than in the appended claims.

This invention resolves the drawbacks of the prior art by providing an interlocking block whose male element comprises at one end parts having different sections to create two protruding planes at the level of the planes of contact between these different parts. These protruding parts can cooperate by friction with the protruding planes provided in the female part and thereby cause the holding in place of the most extreme part of the male element in the female element by rotation of the female element or the male element.

In order to accomplish this, this invention is of the type described above and it is remarkable in its broadest sense in that the male element comprises at one end a part of reduced section then a locking part of larger section, to create at the longitudinal ends of the reduced-section part two protruding planes and in that the female element has an opening creating a protruding plane and is of sufficient section to allow introduction of the reduced-section and locking parts, as well as at least one cavity having a section larger than the section of the opening and creating a protruding plane to allow rotation respectively of the protruding planes of the male element on the protruding planes of the female element, or vice versa.

Thus, upon rotation of one element in relation to the other element, the protruding planes come to hold the male element in place in the female element.

The reduced-section part preferably has in section an essentially circular form and the locking section preferably has in section an essentially square form of length essentially equal to the diameter of the reduced-section part to facilitate such rotation. Thus, in this version, the rotation is of the quarter-turn type.

Each block can be constituted by two portions that can be assembled by their internal surfaces by assembly means.

The invention also pertains to a unit with block portions and to a decorative unit constituting a piece of furniture of the shelf, table or coat rack type, for example, created by assembly of a multiplicity of blocks according to the invention.

The block according to the invention has essentially two variants. In a first variant of the invention, the block comprises a longer male element to enable locking a supplementary flat element between two blocks by introducing the male element into a hole provided in the supplementary flat element. The male element is optionally removable from the block. The space inside the block between the opening of the female end and the opening of the male end is preferably empty.

In a first variant of the invention, the block comprises a female element having two internal protruding planes to enable the direct holding in place of a block when the distal protruding plane is used and to enable the holding in place of a supplementary flat element between two blocks when the proximal protruding plane is used.

An important advantage of the invention is to make possible the creation of decorative objects whose assembly and stability are directly ensured by the essential constitutive elements of the object without requiring the use of supplementary parts.

Another important advantage of the invention is to make possible the creation of decorative columns that are simple to assemble, simple to disassemble and are modular.

Another important advantage of the invention is to make possible the creation of decorative columns which also provide for the holding in place of horizontal elements that can be used as a work surface, shelf or base.

Another important advantage of the invention is to make possible the creation of decorative units which are modular not only in their general appearance but also in the specific appearance of each of the components. For example, it is possible to assemble two portions of blocks whose external surfaces are different to form a particular type of block.

Thus, the invention is particularly applicable to the field of construction sets for children.

Figure 1:
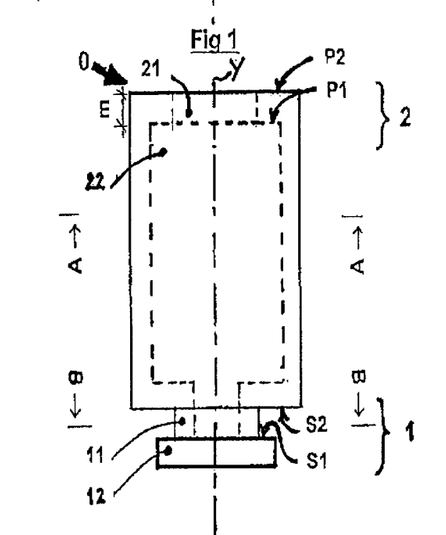
FIG. 1 illustrates a front view of a first variant of an interlocking block according to the invention.
Figures 2, 3, 4:
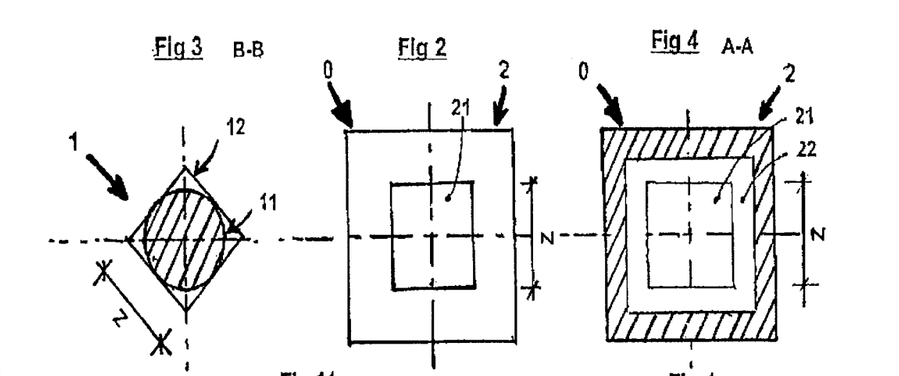
FIG. 2 illustrates a top view of the interlocking block of FIG. 1.
FIGS. 3 and 4 illustrate a cross-sectional view taken along line B—B and along line A—A of the interlocking block of FIG. 1, respectively.

Turning now to the drawings, a block according to the invention is an interlocking block (0), as shown in FIGS. 1 and 2, having, e.g., a parallelepiped form and a square section or an exterior surface (45) (See FIG. 20) of any form and it is of the type comprising, on at least one male end, a male element (1) in the form of an appendage intended to be introduced partially and held in place in a concave female element (2) provided in another block (0) for the creation of a modular decorative unit.

The block (0) according to the invention is characterized in that the male element (1) comprises in the longitudinal direction, at one end, a reduced-section part (11) then a locking part (12) of larger section, to create at the longitudinal ends of the reduced-section part (11) two protruding planes S1 and S2 and in that said female element (2) presents an opening (21), creating a protruding plane P2 and of section sufficient to allow the introduction of said parts (11) and (12), as well as at least one cavity (22) presenting a section larger than the section of the opening (21) and creating a protruding plane P1, so as to enable the rotation R of the protruding planes S1 and S2, respectively, on the protruding planes P1 and P2, or vice versa of the protruding planes P1 and P2, respectively, on the protruding planes S1 and S2.

In order to facilitate this rotation R, it is preferable that the reduced section part (11) comprises a section that is at least partially circular. Thus, the reduced-section part (11) can rotate in the opening (21) and the locking part (12) prevents the male element from being withdrawn from the female element after rotation.

The reduced-section part (11) preferably has in section an essentially circular form, of diameter Z, to facilitate such rotation. Furthermore, the locking section (12) preferably has in section an essentially square form and the length of the side of the square form is essentially equal to the diameter Z of the reduced-section part (11), as shown in FIG. 3, to facilitate introduction of the locking part (12) in the cavity (22). Thus, the rotation that enables the longitudinal locking is of the quarter-turn type.

Furthermore, when the opening (21) of the female element (2) has in section an essentially square form and when the length of the side of the square is essentially equal to the diameter Z of the reduced-section part (11), as shown in FIG. 4, the locking part (12) is then held more firmly in place in the female element (2).

The block (0) has a longitudinal axis of symmetry Y and the locking part (12) of the male element (1) is preferably offset transversely by 45□ in relation to the opening (21) of the female element (2) to enable alignment of the square-section blocks (0) after rotation R of one quarter turn.

Temporary rotational locking means are preferably provided on the protruding planes S1/P1 and/or S2/P2.

In a first variant, for the protruding planes S1 and S2 to cooperate, respectively, with the protruding planes P1 and P2, the reduced-section part (11) has a length essentially equal to the depth E of said opening (21).

Figure 5:
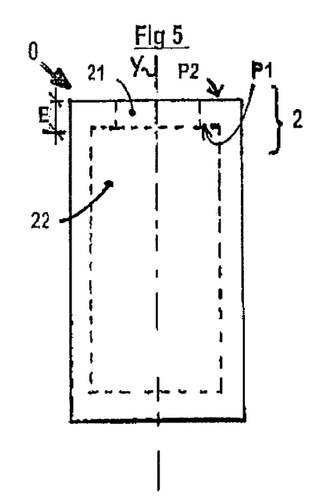
FIG. 5 illustrates a front view of a base or top block for the first variant of the invention.

When the block (0) is used to create a column in association with other blocks (0), it is not necessary that the base block at the bottom end of the column have a male element, as shown in FIG. 5, nor that the top block at the top end of the column have a female element, or vice versa.

Figure 8:
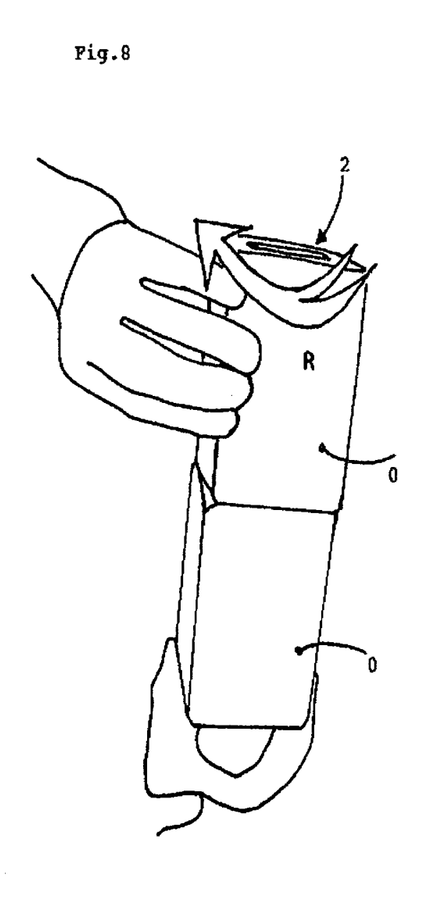

For better comprehension of the invention, an example of implementation of the first variant of the block (0) is presented below, with reference to FIGS. 6, 7 and 8. This example can also be applied for the implementation of the second variant of the block according to the invention.

This implementation requires essentially two phases: a phase of introduction I of the male element (1) into the female element (2) and a phase of rotation R of the male element (1) in the female element (2), or vice versa, to assemble the blocks and to lock longitudinally this assembly.

Figures 6, 7:
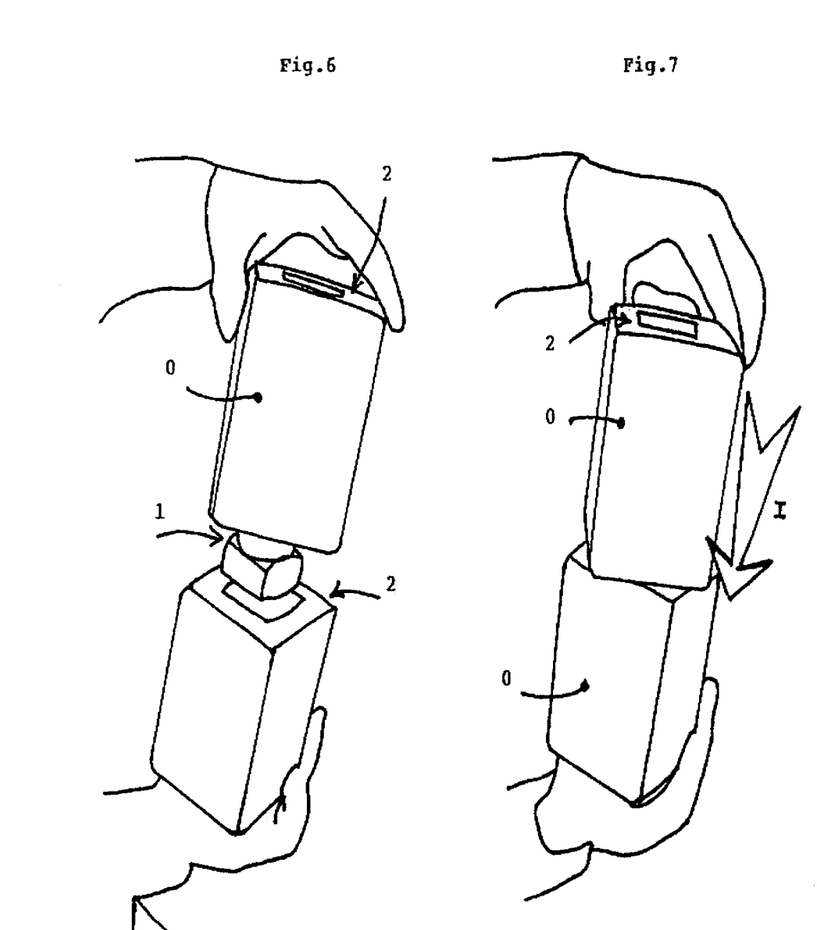
FIGS. 6, 7 and 8 illustrate perspective views of various phases of assembly of two blocks of the first variant of the invention, respectively.

The phase of introduction I of the reduced-section part (11) and the locking section (12) of the male element (1) into the opening (21) of the female element (2) is illustrated in FIG. 6. The juxtaposition of two blocks (0) thereby obtained is shown in FIG. 7. The phase of rotation R of the reduced-section part (11) of the male element (1) in the opening (21) of the female element (2), or vice versa, to lock the locking section (12) in the cavity (22) is illustrated in FIG. 8.

The male element (1), thus, has two surfaces S1 and S2 in contact with two surfaces P1 and P2 of the female element (2). A locking effect is produced when the contact is made.

Figure 9:
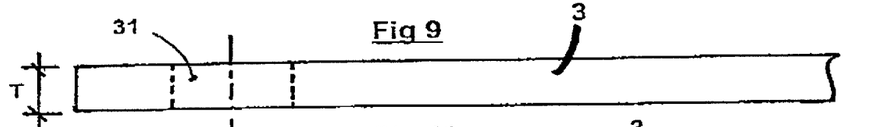
FIGS. 9 and 10 illustrate a profile view and a top view of a flat supplementary element, respectively.
Figure 10:
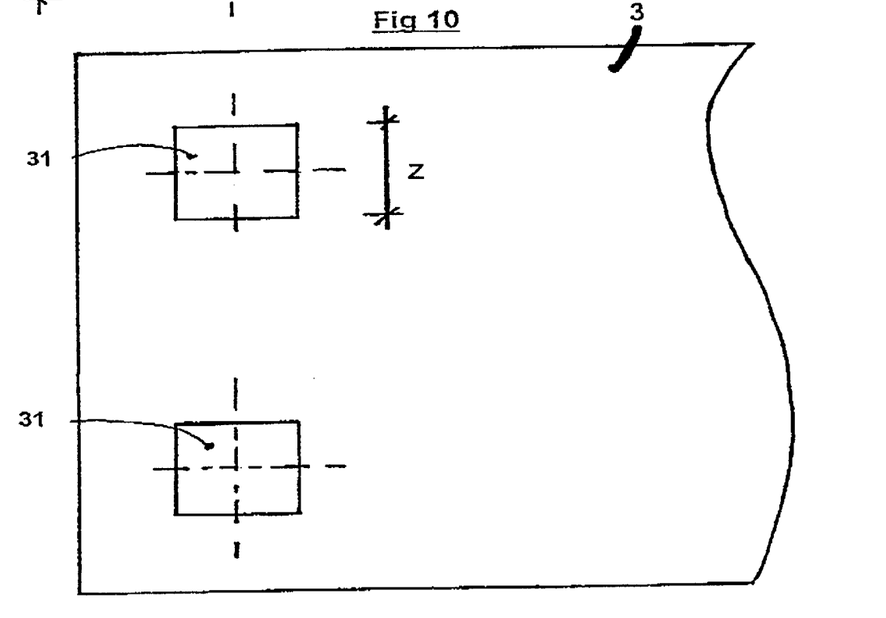

In this first variant of the invention, the lower block (0) can function as a support for a supplementary flat element (3), illustrated in FIGS. 9 and 10, which can be, e.g., a shelf or a work surface, and which is inserted between a lower block (0) and an upper block (0).

In order to assemble this supplementary flat element (3) between two blocks (0), the supplementary flat element (3) has a hole (31) of section sufficient to allow passage of the reduced-section part (11) and the locking part (12) of the male element (1).

Figure 11:
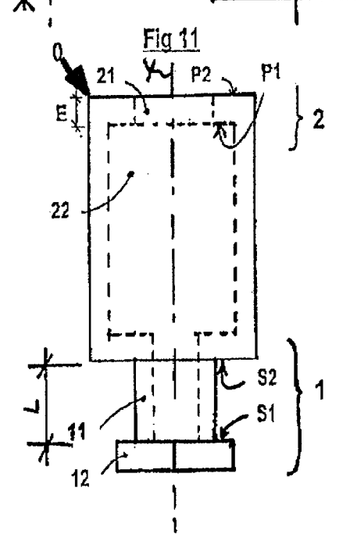
FIG. 11 illustrates a front view of the block according to the invention that makes it possible to hold in place a flat supplementary element.
Figure 12:
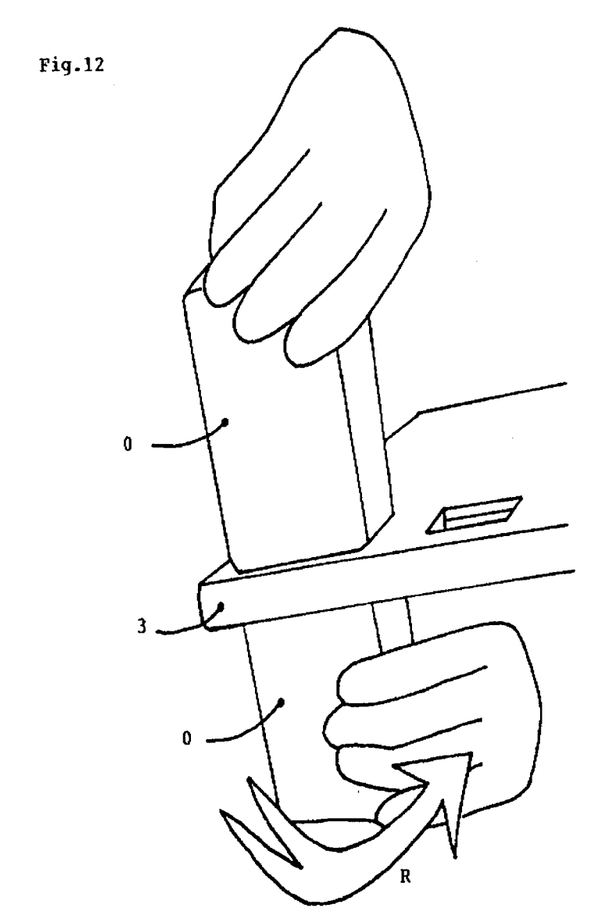
FIG. 12 illustrates a perspective view of the assembly of two blocks of the first variant of the invention and a supplementary flat element.

In this first variant of the invention, the reduced-section part (11) thus has a length essentially equal to the depth E of the opening (21) augmented by the thickness T of the supplementary flat element (3) as shown in FIG. 11. In this variant, the protruding plane S1 cooperates with the protruding plane P1 and the supplementary flat element (3) is positioned between the protruding planes S2 and P2. Hole (31) preferably has a square form and the length of the side of the square form is essentially equal to the diameter Z of the reduced-section part (11). The supplementary flat element (3) is then wedged between the lower block and the upper block as shown in FIG. 12.

Figure 13:
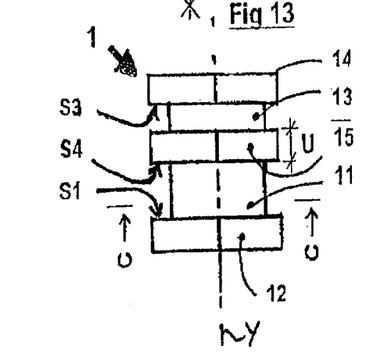
FIGS. 13 and 14 illustrate a front view of the removable male element of a block of the first variant of the invention and a cross-sectional view taken along line C—C of FIG. 13, respectively.
Figure 14:
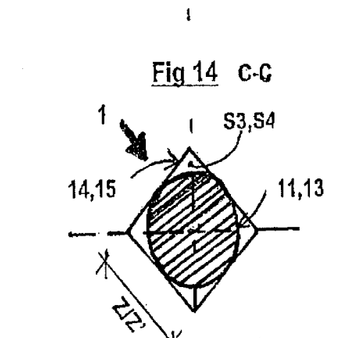

In another version of the first variant of the invention, the male element (1) is an intermediate element which interlocks in a removable manner with the block (0). In order to achieve this, it has at the end opposite the locking part (12) a second reduced-section part (13) then a linking part (14) to create a protruding plane between the two parts (13) and (14) as shown in FIGS. 13 and 14.

Figure 15:
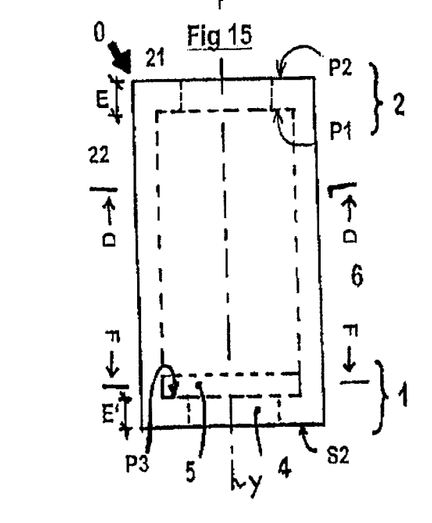
FIGS. 15, 16 and 17 illustrate a front view of a block of the first variant of the invention with a removable male element, a cross-sectional view taken along line D—D of FIG. 15 and a cross-sectional view along F—F of FIG. 15, respectively.
Figure 16:
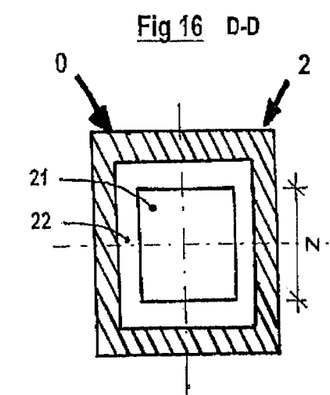

Moreover, this block (0) has at its male end an opening (4) of section sufficient to allow introduction of the second reduced-section part (13) and the linking part (14) in the male end of the block (0) and creation of a protruding plane P3 intended to cooperate by rotation with the protruding plane S3 as illustrated in FIGS. 15 and 16. In order to facilitate this rotation R, it is preferable that the second reduced-section part (13) have a section that is at least in part circular. The second reduced-section part (13) preferably has in section an essentially circular form, diameter Z', to facilitate this rotation as well as a length close to the depth E' of the opening (4).

Figure 17:
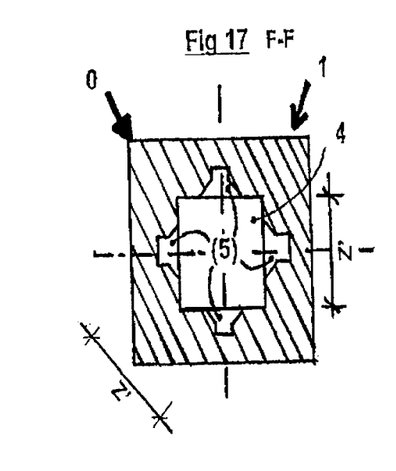

Moreover, the linking part (14) has in section an essentially square form and the length of the side of the square form is essentially equal to the diameter Z' of the second reduced-section part (13). To enable locking of the protruding plane S3 of the linking part (14) after rotation of the male element (1) in relation to the block (0) or vice versa, the opening (4) preferably comprises on its interior surface a multiplicity of recesses (5), as shown in FIG. 17.

Figure 18:
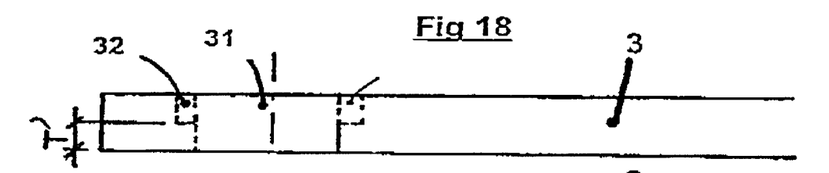
FIGS. 18 and 19 illustrate a profile view and a top view of a supplementary flat element for the first variant with removable male element or for the second variant, respectively.
Figure 19:
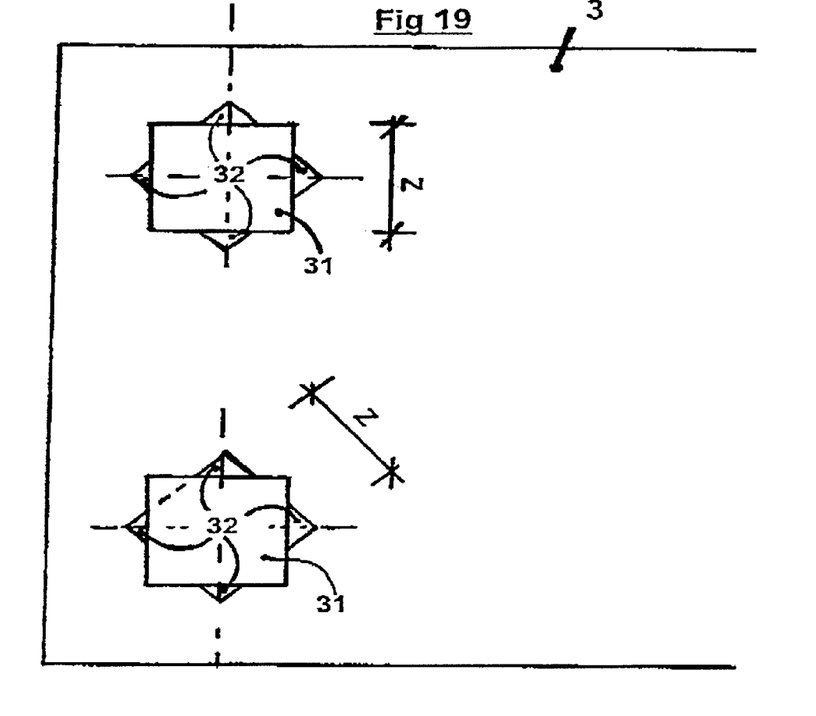

In order to hold in place the supplementary flat element (3), the male element (1) further comprises, between the reduced-section parts (11) and (13), a support part (15) of larger section to create a protruding plane S4 between the two parts (11) and (15) and the thickness U of which is subtracted from the length of the reduced-section part (11). Multiple recesses (32) are, thus, preferably provided around the hole (31) so as to rotationally lock the protruding plane S4 against the plane P4, as shown in FIGS. 18 and 19.

The first reduced-section part (11) preferably has a thickness substantially equal to the sum of the thicknesses E and E', and these thicknesses are preferably identical.

Thus, the male element (1) has a unique configuration, irrespective of the versions and when no supplementary flat element (3) is inserted between two succesive blocks (0), the plane S4 can cooperate with the plane P3.

The two reduced-section parts (11) and (13) preferably have identical diameters.

To facilitate the holding in place of the interlocked unit, it is moreover preferable to align the square forms of the parts (12), (14) and (15) along the axis of the reduced-section parts (11) and (13), as shown in FIG. 13.

The recesses (32), like the recesses (5), preferably present a triangular form, and form the four corners of a square having a side of length Z or Z', respectively. The ends of the triangles can furthermore be enlarged to facilitate locking.

All of the versions of the invention make it possible to save on material since space (6) in the interior of the block (0) between the male part (1) and the female part (2) can be empty.

The depths E and E' of the openings (21) and (4), respectively, are preferably substantially identical.

Moreover, if the male element (1) is removable, it is not necessary to make specific bottom or top blocks without male elements (1).

Figure 20:
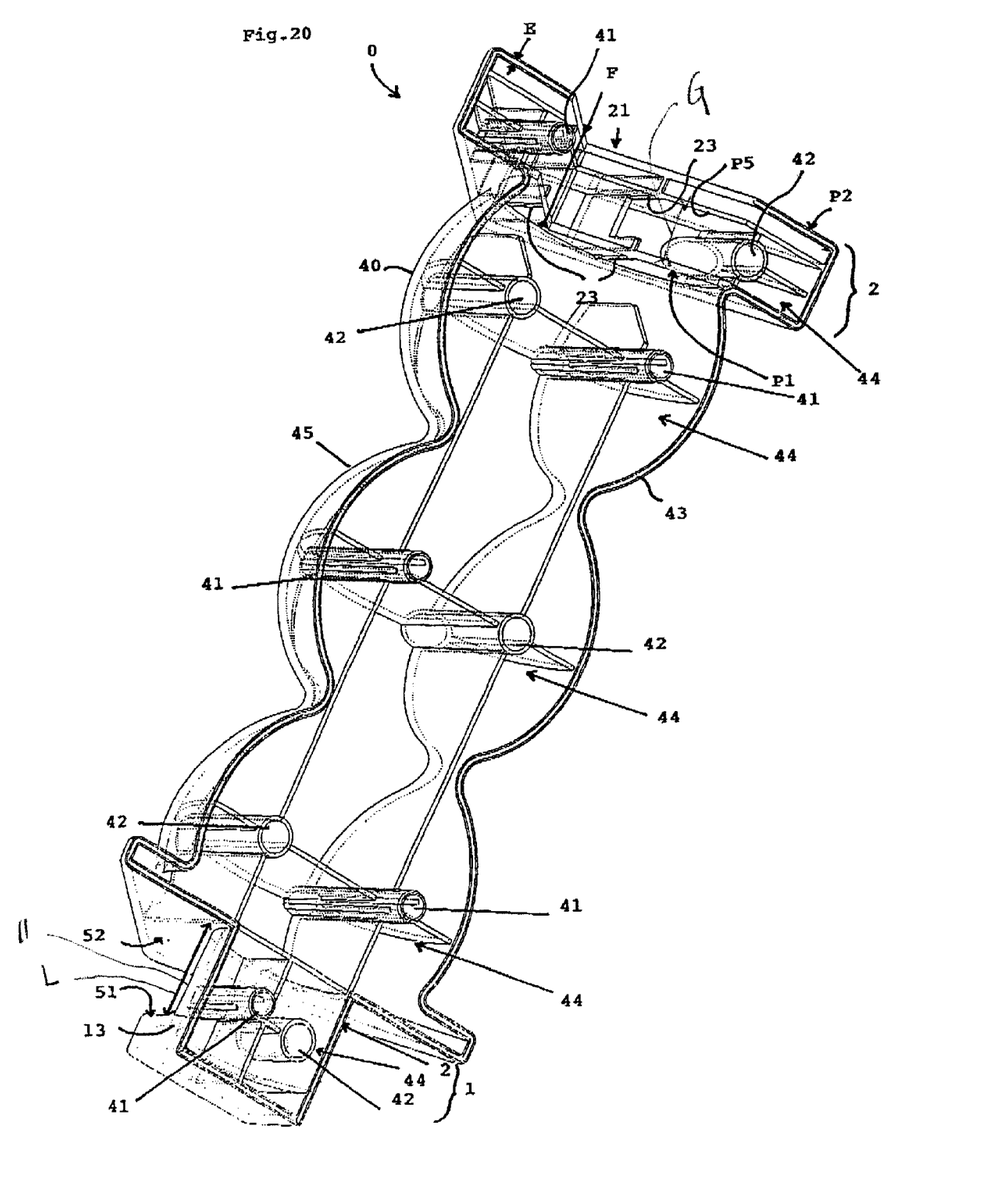
FIG. 20 illustrates a profile view of a portion of the second variant of the interlocking block according to the invention.

In the second variant of the invention illustrated in FIG. 20, the reduced-section part (11) has a length L essentially equal to the length F of the cavity (22) and the cavity (22) has an intermediate protruding plane P5 located at a distance G from the protruding plane P1 substantially equal to the intermediate thickness T' of a supplementary flat element (3), shown in FIGS. 18 and 19, the supplementary flat piece (3) comprising a hole (31) of section sufficient to allow passage of the reduced-section part (11) and the locking part (12) of the male element (1), a multiplicity of recesses (32) being provided around the hole (31) to rotationally lock the protruding plane P2 and the intermediate thickness T' being constituted of the distance between the bottom of the recesses (32) and an exterior surface of said supplementary flat element (3).

This second variant has the advantage of being more modular than that of the first variant because the female part includes means both for holding in place the directly adjacent block and means for holding in place the supplementary flat element (3) by cooperation with an adjacent block. Also, it is not necessary to provide base blocks.

The examples of implementation presented for the first variant of the block according to the invention illustrated in FIGS. 6 to 8 and 12 are also applicable to this second variation.

Temporary rotational locking means provided on the protruding planes S1/P1 and/or S2/P2 are each constituted, e.g., by a boss (26) provided on a protruding plane, e.g., the plane S1, that can cooperate with a groove (16) provided on the adjacent protruding plane during assembly, e.g., the plane P1. The temporary rotational locking means can also be constituted, e.g., by clipping means. The temporary rotational locking means can further be constituted by stop means preventing rotation and making it necessary to rotate in the opposite direction when unlocking.

The interlocking block (0) according to the invention preferably has in both of these two variants a longitudinal axis of symmetry Y and can be constituted of two longitudinal portions (40) that can be assembled according to a direction parallel to the axis Y by assembly means.

The assembly means are constituted, e.g., by a multiplicity of appendages (41) intended to cooperate with a multiplicity of holes (42), the appendages (41) having a diameter slightly larger than the diameter of the holes (42), the appendages (41) and the holes (42) being provided on the interior surface (43) of the portions. The appendages (41) and the holes (42) are preferably laid out transversely in pairs (44), each of the pairs (44) being constituted by an appendage (41) and a hole (42).

Figure 21:
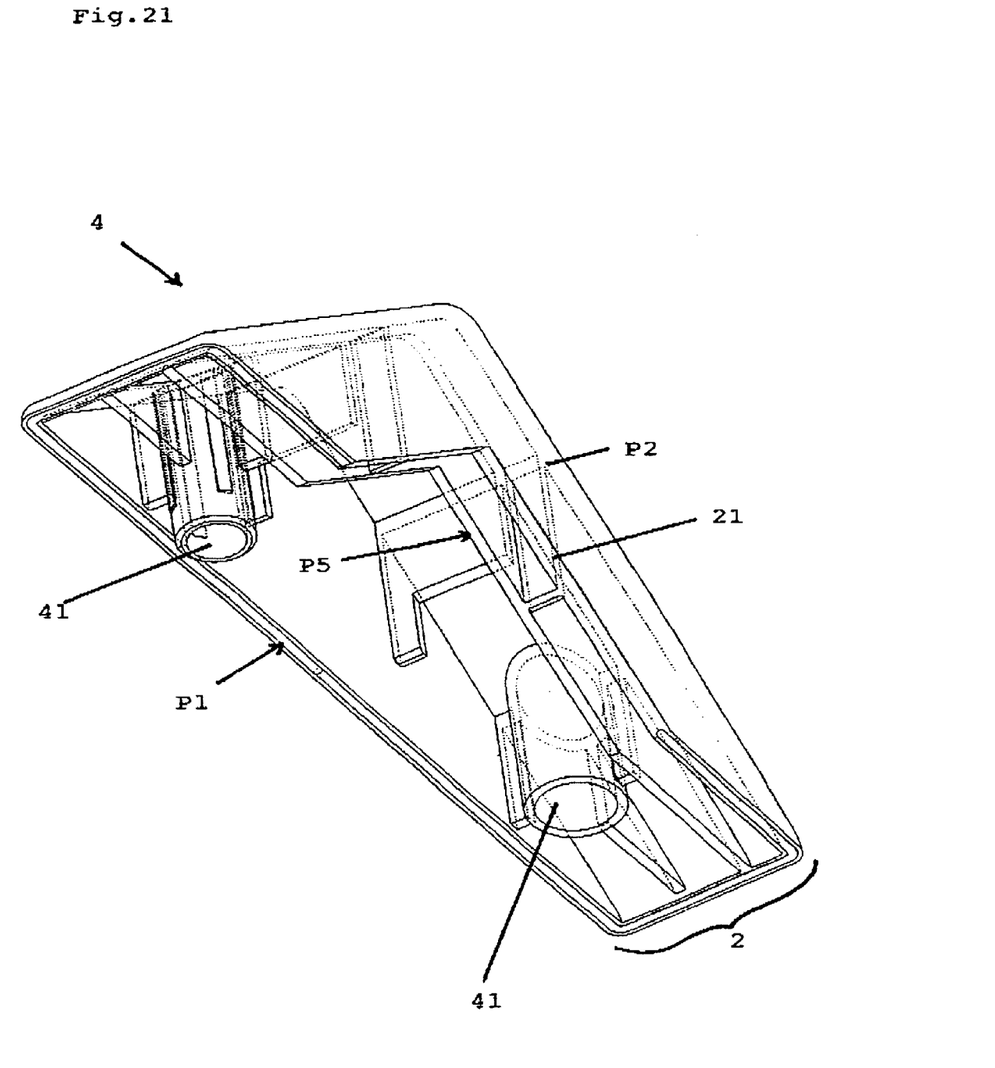
FIG. 21 illustrates a profile view of a stopper according to the invention for blocking the holes of flat supplementary flat elements.

The interlocking block (0) according to the invention can, of course, be made of different natural or synthetic materials. The second variant, as shown in FIGS. 20 and 21, is more particularly intended to be created by molding a plastic material. Internal reinforcement can be positioned inside the block portion.

The invention also pertains to a set of block (0) portions (40) in which at least a part of the portions (40) have an identical interior surface (43) and a different exterior surface (45) to be able to reverse the portions constituting each block.

Figure 22:
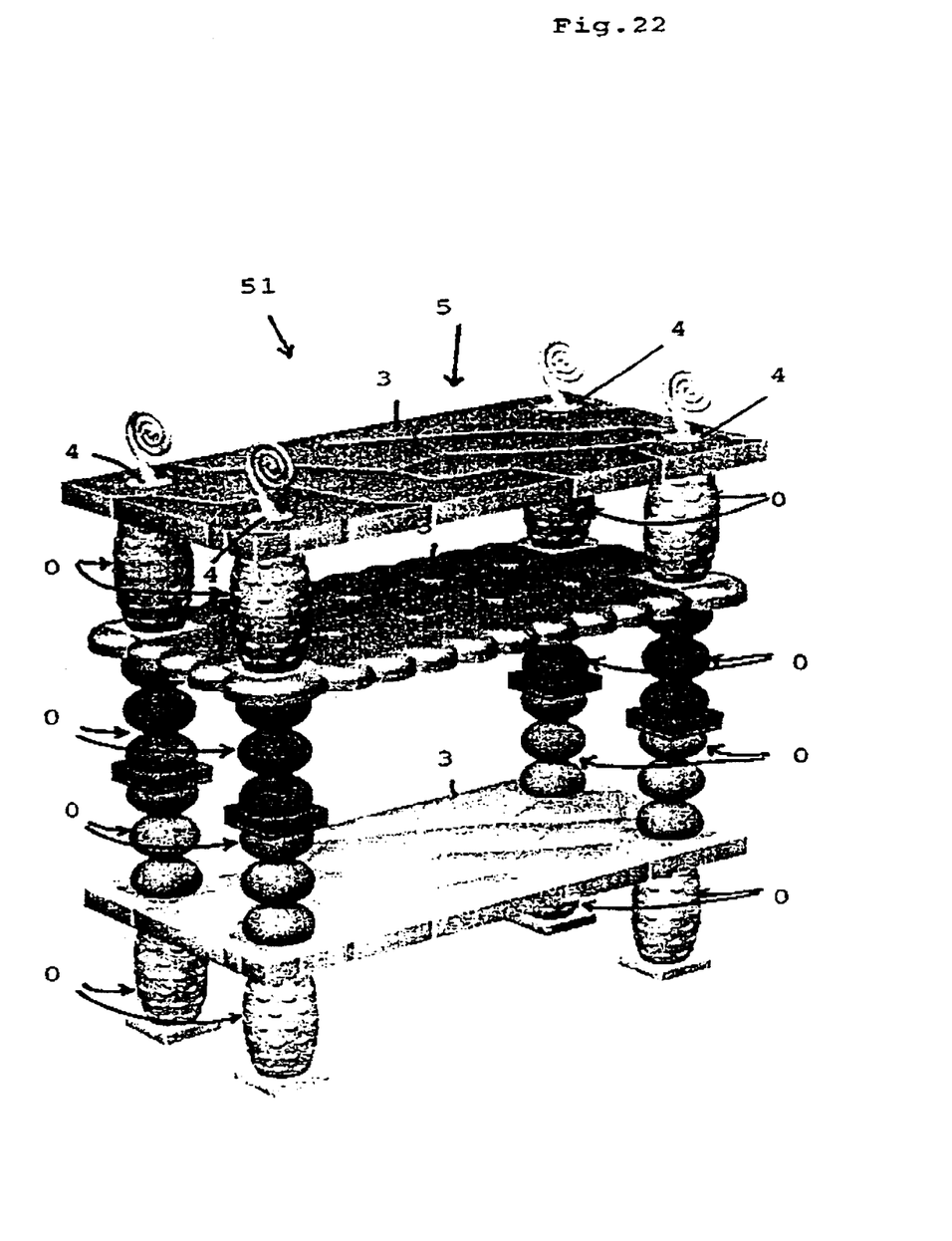
FIG. 22 illustrates a profile view of a shelving unit created with interlocking blocks according to the second variant of the invention.
Figure 23:
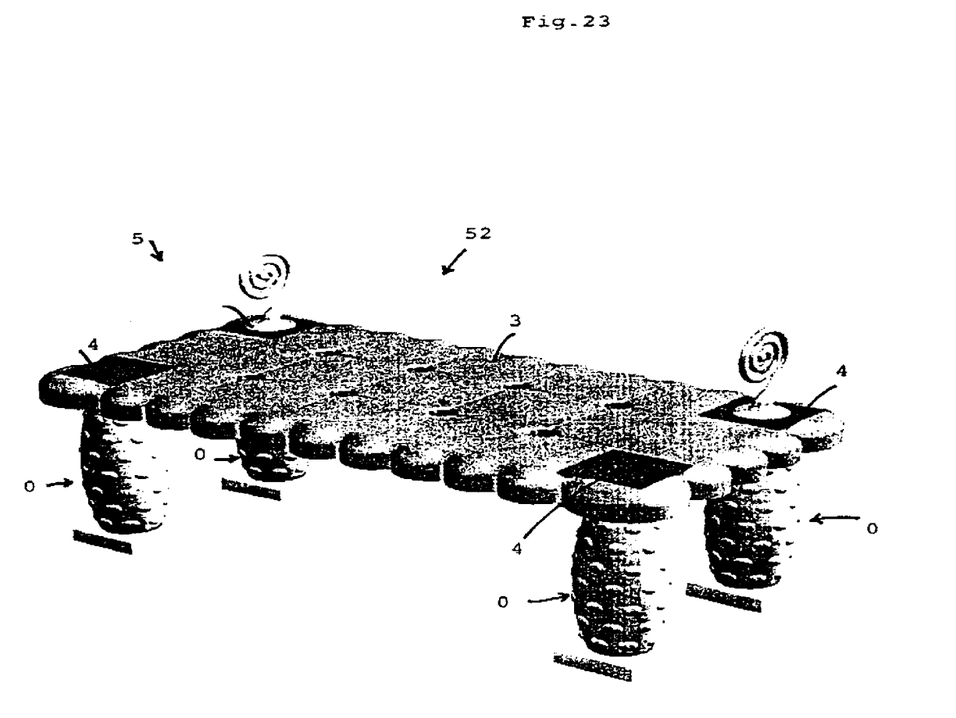
FIG. 23 illustrates a profile view of a seat created with interlocking blocks according to the second variant of the invention.
Figure 24:
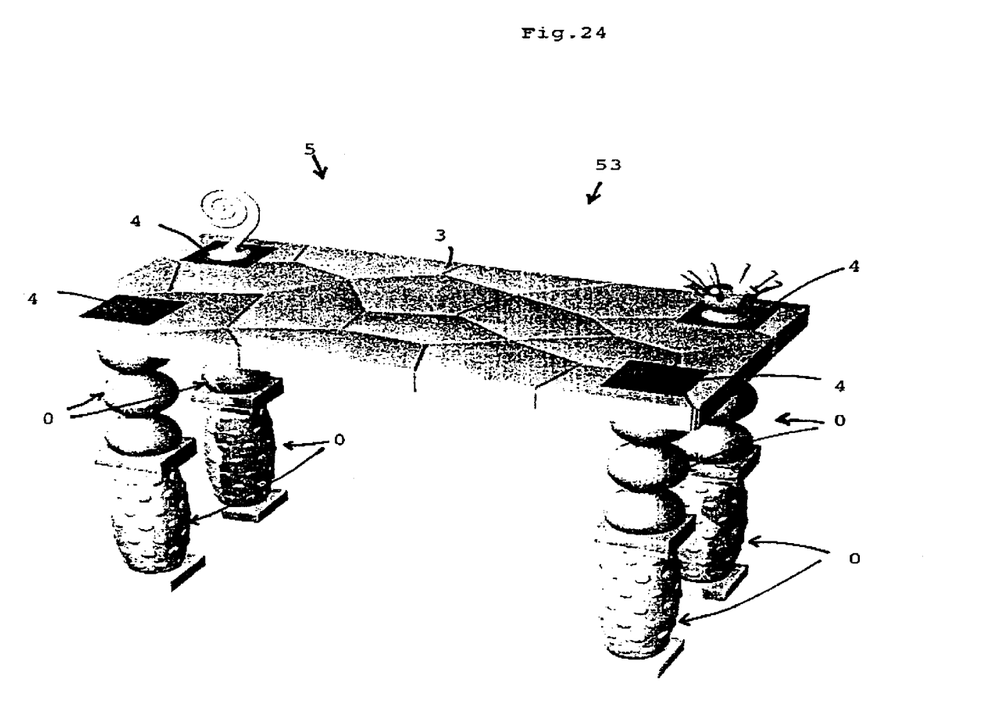
FIG. 24 illustrates a profile view of a table created with interlocking blocks according to the second variant of the invention

The invention also pertains to a decorative unit (5) constituting furniture such as shelving (51) as shown in FIG. 22, a seat (52) as shown in FIG. 23 or a table as shown in FIG. 24, created by assembly of a multiplicity of blocks (0) according to the invention and possibly of one or more supplementary flat elements (3).

The holes (31) of the supplementary flat element(s) (3) can be finished by means of a cap (4) constituted by a female element (2), the protruding plane P1 of which is flat or has a decorative element, as shown in FIG. 21.

The invention is described above as an example. It is understand that an expert in the field could create different variants of the invention without thereby going beyond the scope of the invention.

What is claimed is:

1. A modular construction unit comprising an assembly of a multiplicity of interlocking blocks, at least one of said blocks comprising, on at least one male end, a male element adapted to be introduced partially and held in place in a concave female element provided in another one of said blocks, wherein
    said male element comprises at one end thereof, a first part having in section an essentially circular form of a selected diameter Z and a locking part having in section an essentially square form of larger section to create at longitudinal ends of the first part protruding planes S1 and S2, the length of sides of the square form being essentially equal to the diameter Z of the first part and
    said female element having an opening having in section an essentially square form and creating a protruding plane P1, the length of sides of the square form being essentially equal to the diameter Z of the first part, as well as at least one cavity having a section larger than the section of the opening and creating a protruding plane P2,
    to enable rotation R of the protruding planes S1 and S2, respectively, on the protruding planes P1 and P2, or vice versa.

2. The modular construction unit according to claim 1, wherein the at least one block has a longitudinal axis of symmetry Y and in that the locking part of the male element is offset transversely by 45° in relation to the opening in the female element.

3. The modular construction unit according to claim 1, wherein the first part has a length L essentially equal to a depth E of the opening augmented by a thickness T of a supplementary flat element, the supplementary flat element comprising a body portion having hole of section sufficient to allow passage of the first part and the locking part of the male element.

4. The modular construction unit according to claim 3, wherein the hole has a square form and the length of sides of the square form are essentially equal to the diameter Z of the first part.

5. The modular construction unit according to claim 1, wherein the male element comprises at an end opposite the locking part, a second reduced-section part and a linking part to create a protruding plane S3 between the second-reduced section and the linking parts, and the block has at the male end an opening of section sufficient to allow introduction of the linking part and creating a protruding plane P3 to cooperate by rotation with the protruding plane S3.

6. The modular construction unit according to claim 5, wherein the opening in the male element has an interior face with a multiplicity of recesses to enable locking the protruding plane S3 after rotation of the male element in relation to the at least one block or vice versa.

7. The modular construction unit according to claim 5, wherein the second reduced-section part has in section an essentially circular form of diameter Z'.

8. The modular construction unit according to claim 7, wherein the linking part has in section an essentially square form and the length of sides of the square form are essentially equal to the diameter Z' of the second reduced-section part.

9. The modular construction unit according to claim 5, wherein the male element comprises between the first part and the second reduced-section part, a support part of larger section to create a protruding plane S4 between the first part and the support part for holding in place a supplementary flat element and a thickness U of which is subtracted from the length of the reduced-section part.

10. The modular construction unit according to claim 9, wherein multiple recesses are provided around the hole to rotationally lock the protruding plane S4.

11. The modular construction unit according to claim 1, wherein the first part has a length L essentially equal to a length F of the cavity and the cavity has an intermediate protruding plane P5 located at a distance G from the protruding plane P1 equal to an intermediate thickness T' of a supplementary flat element, the supplementary flat element comprising a body portion with a hole of section sufficient to allow passage of the first part and the locking part, a multiplicity of recesses being provided around the hole to rotationally lock the protruding plane P2 and the intermediate thickness T' being the distance between the bottom of the recesses and an exterior surface of the supplementary flat element.

12. The modular construction unit according to claim 1, further comprising temporary rotational locking means provided on the protruding planes S1/P1 and/or S2/P2.

13. The modular construction unit according to claim 12, wherein each of the temporary locking means has a boss provided on a protruding plane capable of cooperating with a groove provided on an adjacent protruding plane.

14. The modular construction unit according to claim 1, wherein the at least one block has a longitudinal axis of symmetry Y and two longitudinal portions that can be assembled along a direction parallel to the axis Y by means of assembly means.

15. The modular construction unit according to claim 14, wherein the assembly means has a multiplicity of appendages adapted to cooperate with a multiplicity of holes, the appendages having a diameter slightly larger than the diameter of said holes, said appendages and the holes being provided on an interior surface of the longitudinal portions.

16. The modular construction unit according to claim 15, wherein the appendages and the holes are laid out transversely by pairs, each of the pairs having an appendage and a hole.

17. The modular construction unit according to claim 14, wherein the longitudinal portions have a substantially identical interior surface and a different exterior surface.

18. The modular construction unit according to claim 3, wherein the holes of the supplementary flat element(s) are finished with a cap formed from a female element the protruding plane P1 of which is flat or has a decorative element.

19. An interlocking block for a construction unit according to claim 1.

20. A supplementary flat element for a construction unit according to claim 3.

21. A decorative unit constituting a piece of furniture of the shelving seat or table type, created by assembly of a multiplicity of blocks according to claim 19.

22. A decorative unit constituting a piece of furniture of the shelving seat or table type, created by assembly of one or more supplementary flat elements according to claim 20.

* * * * *